(12) United States Patent
Balgård et al.

(10) Patent No.: US 8,165,141 B2
(45) Date of Patent: Apr. 24, 2012

(54) METHOD FOR CONFIGURING A NODE OF AN INDUSTRIAL WIRELESS NETWORK

(75) Inventors: Lennart Balgård, Arboga (SE); Tomas Lennvall, Västerås (SE); Stefan Svensson, Västerås (SE)

(73) Assignee: ABB Research Ltd., Zürich (CH)

( * ) Notice: Subject to any disclaimer, the term of this patent is extended or adjusted under 35 U.S.C. 154(b) by 564 days.

(21) Appl. No.: 12/393,398

(22) Filed: Feb. 26, 2009

(65) Prior Publication Data

US 2009/0224906 A1 Sep. 10, 2009

(30) Foreign Application Priority Data

Feb. 26, 2008 (EP) .................................... 08151919

(51) Int. Cl.
*H04L 12/28* (2006.01)
*H04M 1/66* (2006.01)
(52) U.S. Cl. ........................ 370/401; 455/410
(58) Field of Classification Search .................. None
See application file for complete search history.

(56) References Cited

U.S. PATENT DOCUMENTS

2004/0259533 A1* 12/2004 Nixon et al. ............... 455/414.1
2005/0007985 A1* 1/2005 Park et al. ..................... 370/338
2005/0090262 A1* 4/2005 Hamano et al. ............... 455/445
2006/0002355 A1* 1/2006 Baek et al. ..................... 370/338
2006/0082817 A1 4/2006 Crosier et al.
2007/0165656 A1* 7/2007 Dobrowski et al. ........... 370/401
2007/0243830 A1* 10/2007 Isenmann et al. .......... 455/67.11
2007/0280286 A1* 12/2007 Hodson et al. ................ 370/466
2008/0056198 A1* 3/2008 Charpentier et al. ......... 370/332
2008/0183935 A1* 7/2008 Guenter et al. ............... 710/305
2008/0273547 A1* 11/2008 Phinney ........................ 370/437
2009/0125713 A1* 5/2009 Karschnia et al. ............ 713/153

OTHER PUBLICATIONS

European Search Report—Aug. 26, 2008.
European Search Report—Nov. 10, 2008.

* cited by examiner

*Primary Examiner* — Hassan Phillips
*Assistant Examiner* — Eunsook Choi
(74) *Attorney, Agent, or Firm* — Venable LLP; Eric J. Franklin (57) ABSTRACT

A method for joining a wireless node of a field device such as a sensor or actuator to a wireless network connected to an industrial monitoring or control system. A handheld wireless device is utilized including hardware and software for communicating with the wireless node of a field device. A new communication configuration necessary for the new node to use in order to join the wireless network is sent from the handheld device to a new node. A wireless handheld device and an industrial monitoring or control system and a computer program.

36 Claims, 4 Drawing Sheets

METHOD FOR CONFIGURING A NODE OF AN INDUSTRIAL WIRELESS NETWORK

CROSS-REFERENCE TO RELATED APPLICATIONS

This application claims priority to European patent application 08151919.1 filed 26 Feb. 2008.

TECHNICAL FIELD

The invention concerns a method and a device for communicating with a field device or sensor connected to an industrial monitoring or control system. In particular the device is a wireless configuration device arranged for use with configuring a wireless node in a distributed control system, or industrial monitoring or control system arranged with a wireless data network.

TECHNICAL BACKGROUND

A sensor, actuator and/or measuring instrument intended to be connected to a process control system in an oil production facility, or an industrial monitoring or control system or a distributed control system (DCS) requires configuration settings in order for it to correctly perform the connection. These configuration settings are downloaded to the sensor, actuator or any other type of field device at the time it is being deployed in the field, usually using a physical connection. This physical connection may be a wired signal connection to the field device or a direct wire connection between the field device and a handheld configuration unit or computer. A communication infrastructure of an industrial monitoring or control system frequently contains a wired fieldbus infrastructure to which a large number of field devices can be connected and controlled. Such an industrial monitoring or control system may include one or more wireless networks. The same system may utilize a number of different field bus communication protocols such as Foundation, HART and Profibus.

Field devices may be arranged for wireless communication such that data or other information is exchanged wirelessly between an industrial monitoring or control system and the field device. A system may use more than one wireless protocol or standard such as ZigBee, Bluetooth, WirelessHART or a protocol developed by ABB called Wireless interface for sensors and actuators (WISA). For wireless systems the configuration data also contains security and network information which allows the device to join the wireless network. This makes it impossible to use the wireless network when downloading the initial configuration settings to the field device. And if the field device is located in a hazardous environment there are requirements that the field device must be physically encapsulated, which makes it difficult to carry out the initial configuration using a direct wire connection between a handheld and the field device.

SUMMARY OF THE INVENTION

According to an aspect of the present invention an improvement is described in a method for joining a wireless node of a field device, said wireless node being preconfigured for use with a second network and arranged configurable for use with a first wireless network connected to an industrial monitoring or control system, using a wireless configuration device arranged with hardware and software for communicating with said second network. The wireless configuration device may also be arranged to communicate with the first network and/or the industrial monitoring or control system.

According to another embodiment of the present invention a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending by means of said second wireless network from said wireless configuration device to at least one said wireless node communication configuration information necessary for the said wireless node of a field device to join said first wireless network.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending the communication configuration information from said wireless configuration device to the new said wireless node of a field device, using said second wireless network and by means of the same wireless hardware used for communicating with said first wireless network.

According to an embodiment of the present invention a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, wherein the wireless technology of said first wireless network is arranged compatible with an industrial standard for wireless communication.

According to an embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, wherein the wireless technology of said first wireless network is arranged compatible with a WirelessHART standard.

According to another embodiment of the present invention a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending the communication configuration information for the new said wireless node of a field device to join said first wireless network which communication configuration comprises information to identify the said first wireless network.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending to the new said wireless node communication configuration information necessary for joining said first network with a data that comprises a security key or code for the new node to be accepted in said first wireless network.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending from the new said wireless node to said wireless configuration device communication configuration information that comprises a unique hardware identity of the new said wireless node.

According to another embodiment of the present invention a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending from said wireless configuration device to said first wireless network communication configuration information about the new node comprising any from the group of: device role name, device tag name, system key or code, security code.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending to the new said wireless node an operational configuration for the new node to operate with in said industrial monitoring or control system.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending from said wireless configuration device to the new said wireless node of a field device using an optical transmitter and/or receiver, the communication configuration information necessary for the new said wireless node to join said the first wireless network.

According to another embodiment a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises sending from said wireless configuration device to the new said wireless node of a field device using an optical transmitter and/or receiver, information to form said second wireless network between said wireless configuration device and the node and after said second wireless network is established, sending to the new node the new communication configuration information necessary for the new node to join said first wireless network.

According to a further embodiment of the invention a method is provided for joining a wireless node of a field device, said wireless node being preconfigured for use with a second network and arranged configurable for use with a first wireless network connected to an industrial monitoring or control system, using a wireless configuration device, said wireless node being preconfigured for operation with a second wireless network, which method comprises accessing a said field device using said second wireless network and carrying out a test procedure on the field device while said field device is connected to said second wireless network advantage Initial configuration of a field device, and in particular for a field device that will be deployed in a hazardous environment, should either be carried out before installation or else carried out after installation in the environment in a safe way. Wired communication between the configuration device and the field device requires a physical interface to be exposed during configuration, which is a potential problem in a hazardous environment. For wireless systems, such as wireless sensor networks (WSN) the configuration data also contains security and network information in order for the field device to connect to the wireless network. This rules out using the wireless network in order to download initial configuration settings to the field device. And if the device is located in a hazardous environment there can exist requirements that the device must be physically encapsulated, which disallows a direct wire connection between a handheld configuration device or laptop and the device to be connected to the wireless network.

The invention provides methods and apparatus for configuration of wireless node of a field device without a physical connection being necessary between the field device and a configuration device such as a laptop or handheld device. The configuration is achieved using a wireless technology to provide the information required to the field device wirelessly, preferably by means of a handheld wireless configuration device, for a specific wireless node of the field device to join a wireless network.

The wireless technology used to communicate information required for a specific wireless node of the field device to join a known or first wireless network may be a wireless radio technology. A preferred technology is a spread spectrum technology using for example an Industrial Scientific and Medical (ISM) band. Such a spread spectrum technology may use any suitable wireless protocol or standard such as any from the group of Wireless Local Area Network (WLAN), WirelessHART, ZigBee, Bluetooth, or a protocol developed by ABB called Wireless interface for sensors and actuators (WISA). In an advantageous embodiment the wireless radio technology allows multiple networks to operate in the same radio space without the risk of sharing data or misrouting messages. This can be done by including a network identity in every message. This network identity is used to bind nodes together into a network. If a node hears a node with a network identity that does not match its own, then it will not initiate joining. The network identity may be information of a similar type to a Service Set Identifier (SSID) used by a node to identify a wireless LAN (Local Area Network) for an 802.11 network. The network identity of a node can be changed by configuration. The same radio hardware and software may be used by the wireless node of the new field device to communicate, using one network identity, in one network with a wireless configuration device, as well as to communicate, using another network identity, in another network with the existing first wireless network. This makes configuration of a new field device with a wireless radio technology, or configuration of a field device which has been re-set, or moved, or where a part has been replaced, a quicker and more flexible operation even in a hazardous environment. Similarly the wireless configuration device may use the same radio hardware and software to communicate using one network identity with a new wireless node and using another network identity with the existing first wireless network.

Field devices may be arranged for wireless communication such that data or other information is exchanged wirelessly between an industrial monitoring or control system and the field device. There may be more than one wireless network operating in an installation, monitoring and/or controlling more than one process, for example. Thus what is described as the first wireless network may be one of a plurality of wireless networks within range of one or more field devices.

In other embodiments, other types of wireless technologies may be used. For example, an optical technology may be used to communicate between a field device and a wireless configuration device. By having a photosensor as well as a light emitter (possible a LED) on both the field device and the wireless configuration device, or handheld, it is possible to communicate to the field device information required for a specific wireless node of the field device to join a known or first wireless network from the handheld directly between them without requiring a physical (i.e., wired) connection. This enables downloading of configuration settings to field devices deployed in hazardous environments. Furthermore, this communication also enables communication of status, configuration settings, and even data from the field device to a handheld device at any time during it's life time, also including during run-time. Other wireless technologies may also be used, such as for example a technology based on Radio Frequency Identification (RFID).

According to another aspect of the invention, an industrial monitoring or control system comprising one or more field devices arranged with a wireless node, and a first wireless network, said wireless node being preconfigured for operation with a second wireless network, said system further comprising a wireless configuration device for communicating with a said wireless node of one or more field devices, wherein that said wireless configuration device further comprises hardware and software for sending by means of said second wireless network from said wireless configuration device to at least one said wireless node of a field device communication configuration information necessary for the new said wireless node of a field device to join said first wireless network.

In a preferred embodiment of the methods of the invention one or more methods may be carried out by a computing device comprising one or more microprocessor units or computers. The control unit of a wireless configuration device comprises memory means or a memory storage device for storing one or more computer programs or a software listing comprising a set of operating instructions for carrying out the improved methods. Preferably such computer program contains instructions for the processor to perform the methods described herein.

BRIEF DESCRIPTION OF THE DRAWINGS

Embodiments of the invention will now be described, by way of example only, with particular reference to the accompanying drawings in which.

DETAILED DESCRIPTION OF THE EMBODIMENTS

Figure 1:
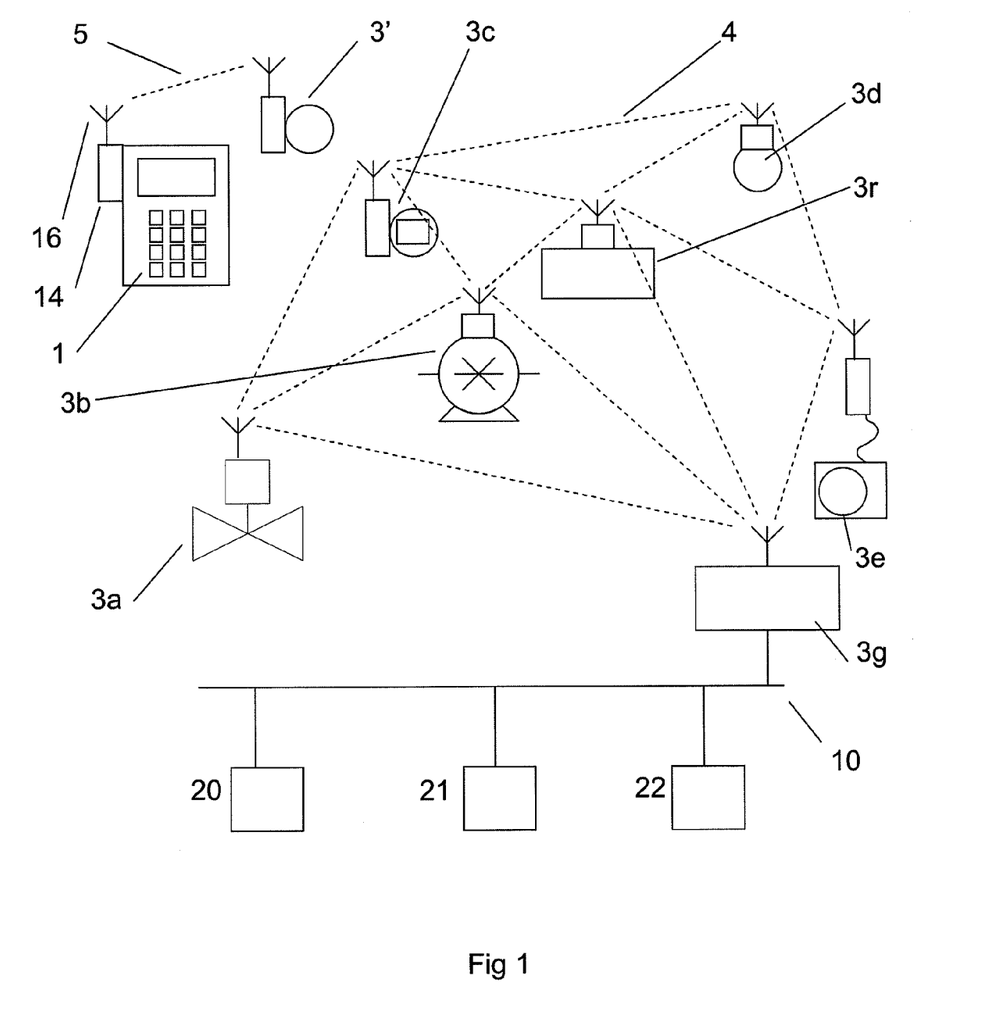
FIG. 1 is a schematic diagram of a wireless network connected to an industrial monitoring or control system showing a wireless configuration device arranged with hardware and software for communicating with new wireless node of a field device to be connected to an industrial monitoring or control system according to an embodiment of the invention.

This invention describes communication and configuration using a wireless configuration device, and a method and system in which the device is employed. FIG. 1 shows a first wireless network 4 connected to a data network 10 of an industrial monitoring or control system (not shown). The first wireless network 4 is shown with 7 nodes 3a-n connected to it. Nodes 3a-e are field devices, being measuring instruments or sensors 3c-e, or else actuators such as motorised valve 3a and pump 3b. Wireless network 4 also has a node 3g which is a gateway of some sort into the data network 10. Node 3r is a router in the first wireless network 4. Also indicated in the diagram is a new field device 3' which is not connected to the first wireless network 4. A wireless configuration device 1 is shown arranged with wireless hardware 14, 16. The wireless configuration device may be a handheld wireless device. The industrial monitoring or control system is symbolically shown to comprise a computer 20, a data server 21 and a process automation controller 22. The process automation controller may be a controller such as an AC800M controller supplied by ABB.

A number of measuring instruments or sensors 3a-e are used to monitor conditions in an industrial installation or a process. These sensors are arranged as wireless nodes and communicate measurement and other data wirelessly to a data network of an industrial control system by means of a gateway 3g. One or more routers 3r or other wireless nodes may be arranged for managing the network in a central and/or local fashion. In this way data about the process or otherwise relevant to the industrial installation is collected wirelessly. More than one wireless network may be operated in an industrial installation. Thus what is described as the first wireless network may be one of a plurality of wireless networks within range of one or more field devices 3a-e.

In order to join a wireless node 3' to a wireless network such as wireless network 4 the node must first be configured with certain information such as a network ID of the target network, wireless network 4, what name the node will have in the network, and security information such as a code or a key to establish in a secure way that the node is or has been authorised to join the network. The name that the node shall have in the wireless network is established during design or engineering of the wireless network and the data gathering system. A network manager or network manager function may also arrange what name a node shall use and which security or key code it shall have. A greater flexibility for installation and replacement or physical movement of wireless nodes is achieved because the configuration of the individual wireless node can take place after installation or replacement and need not be configured during manufacture.

The wireless configuration device 1, or wireless handheld device, may be connected as a network device. Connected as a Network Device, the handheld will communicate with a Gateway or a Network Manager on network related issues. Wireless handheld device 1 may be connected as a maintenance device. The handheld as a maintenance device will communicate with a field device to gather information, run diagnostics, calibrate etc. In addition the handheld will be used to configure a wireless node of a field device.

This may be carried out in the following way for a WirelessHART network and/or for a wireless network operated compatible with other protocols. The inclusion of references to Wireless HART are not in any way limiting as to the type of wireless network in which the invention may be practiced. For example, the plant personnel brings the new wireless node and a compatible handheld, eg a WirelessHART Handheld, to the planned location for the new node. The Handheld has already been setup with the network-id and join key for the Wireless Sensor network (WSN) in the area.

The new wireless node is mechanically mounted and turned on. The wireless node has original default settings for a network ID. It may also have a hardware ID or a device ID such as a unique HARTid entered during a production stage.

The operator then instructs the wireless configuration device to advertise itself or publish itself on a second wireless network which is the equivalent of the pre-configured default network ID of the new wireless device, the default having at least the same network ID. The new wireless node after being turned on listens for messages, or advertising, on the second wireless network and connects to the wireless configuration device. Alternatively the new node transmits advertises itself or publishes itself on the second wireless network and communication with the wireless configuration device starts with the wireless configuration responding to the new node announcement.

At this point the wireless configuration device and the new node are connected by means of the second wireless network 5 (FIG. 1) which is not the same network as the already-formed wireless network, ie the first wireless network 4 (FIG. 1). Subsequently, the wireless configuration device sends communication configuration information to the new node so that it can join the first wireless network 4. The communication configuration information contains the network ID of the first wireless network 4, and also a security key, or code, so that the new node will be accepted in the first wireless network 4.

The node may be pre-configured so that if it does not succeed in joining the first wireless network 4 within a time limit it falls back to the default setup. If the wireless configuration device is arranged to allow communication with a Gateway or Network Manager of the first network or with the industrial monitoring or control system the wireless configuration device may inform the Gateway or Network Manager of the first wireless network that the new node will join. A unique ID or a hardware ID for the node, and/or a Tag name or role name of the new node may also be sent to ensure that both sides of the network has the same translation information. The wireless configuration device 1 or handheld wireless device can monitor the joining progress for the new node.

If the new node joins the WSN correctly the engineer or other plant personnel can then repeat this procedure with the next node.

The communication between wireless handheld device 1 and a new node, forming the second wireless network 5, may be carried out using a wireless radio technology which may be a technology similar to that of the first wireless network 4. Thus the same wireless radio hardware and software may be used to establish the second wireless network between handheld 1 and a new node eg 3'.

Figure 2:
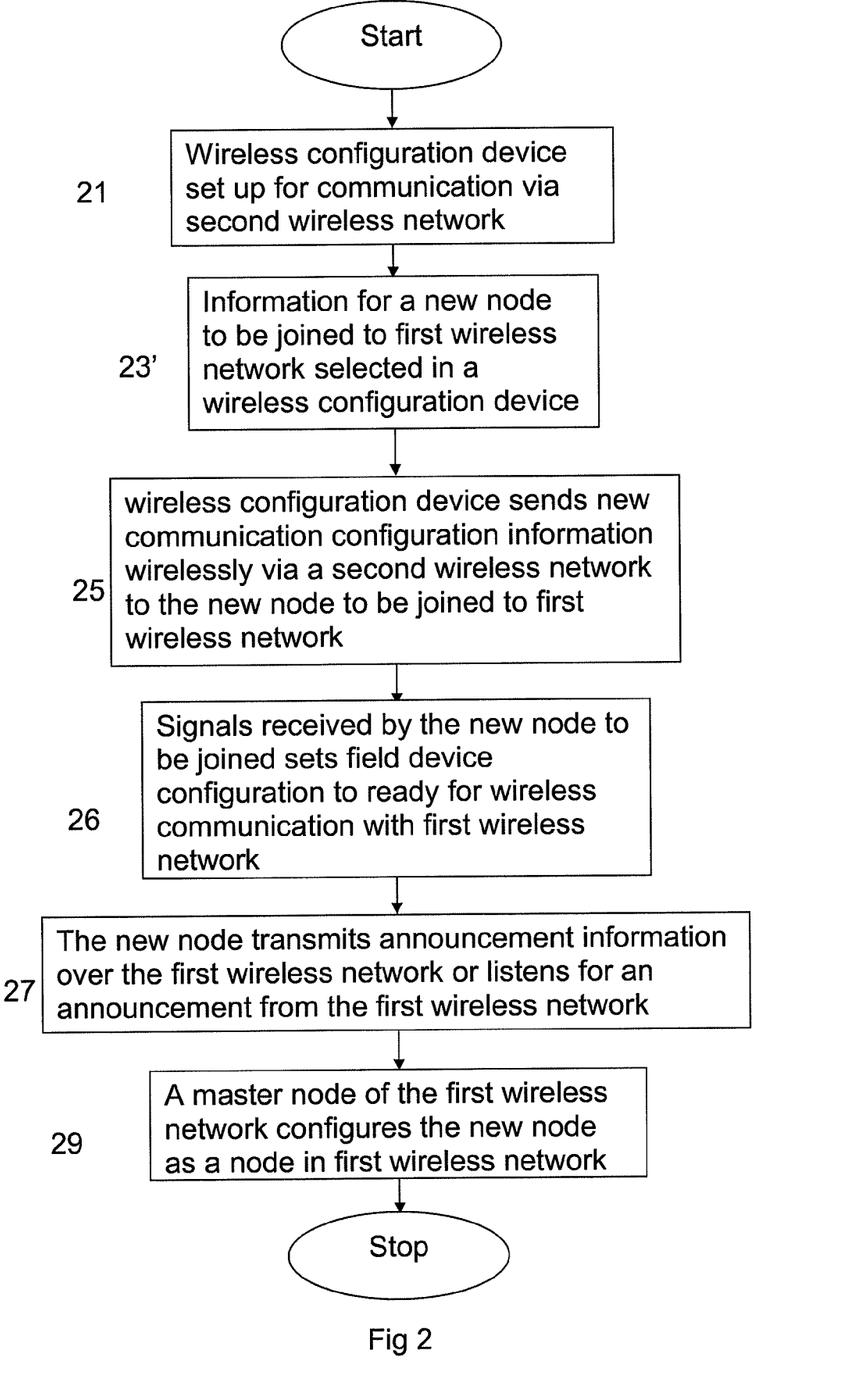
FIG. 2 is a flowchart showing use of the an embodiment of a method according to the invention for using the wireless configuration device for communicating with and configuring a field device in an industrial monitoring or control system.

The flowchart of FIG. 2 shows steps of a method for using the wireless configuration device 1 or handheld wireless device handheld wireless device for communicating with and configuring a wireless node of a field device in an industrial monitoring or control system:

21. Wireless configuration device set up for communication via second wireless network, 23'. Information for a new node to be joined to first wireless network is selected in a wireless configuration device 1 or handheld wireless device transmitter/receiver, where the information may comprise a network ID and a join key (security code), 25. Wireless configuration device 1 (or handheld wireless device wireless device transmitter/receiver) sends new communication configuration information wirelessly over the second wireless network 5 to the new node 3' to be joined to first wireless network 4, 26. Signals received by the new node to be joined sets field device configuration to ready for wireless communication with first wireless network 4, 27. The new node transmits announcement information to the first wireless network OR the new node listens for an announcement from the first wireless network, 29. A master node of the first wireless network accepts the new node as a node in first wireless network 4.

Step 21 may be preceded by a step in which the wireless configuration device or wireless handheld device advertises or publishes itself as a router node. In response to this message, the new node then communicates with the wireless handheld device 1 joining a second wireless network 5.

In another embodiment the wireless configuration device may be used to carry out a test procedure on the field device while said field device is connected to said second wireless network (5). In this way a newly mounted or moved field device, eg a sensor, may be tested using the wireless configuration device over the second wireless network before the field device is connected up to the first wireless network 4.

Figure 4:
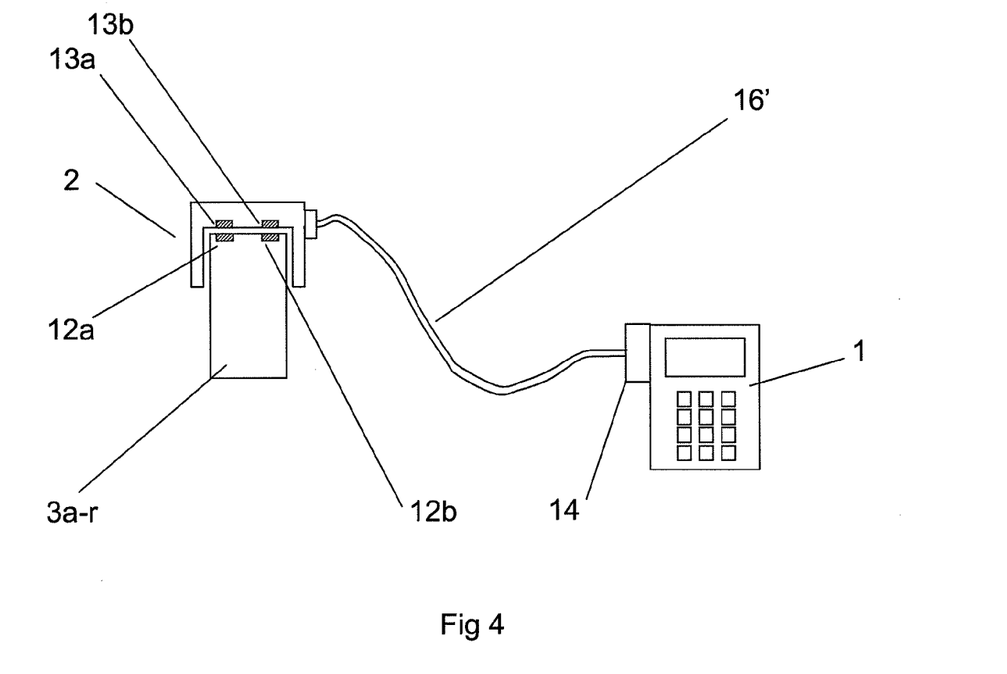
FIG. 4 is a schematic diagram of a wireless configuration device arranged with hardware and software for communicating with an industrial monitoring or control system in a system according to another embodiment of the invention.

In another embodiment the second wireless network may be established using another technology. Communication may be carried out between the handheld and the node using optical technology. FIG. 4 shows in a schematic diagram, a diagram which does not at all indicate relative size or scale of any of the components, a field device in the form of a sensor (3a-e) and two wireless receiver/transmitter devices 12a, 12b. FIG. 4 also shows a connector device 2' which is arranged with two wireless receiver/transmitter devices 13a, 13b suitably arranged so that when connector device 14' is in place on the sensor, the wireless receiver/transmitter devices 13a, 13b of the connector are in close proximity to the wireless receiver/transmitter devices 12a, 12b of the sensor. The connector 2 is arranged with a wired connection 16", for connecting the connector 2 to a data input socket of a handheld unit 1 or directly to a data network 10 or indirectly via a controller or a node.

Figure 5A:
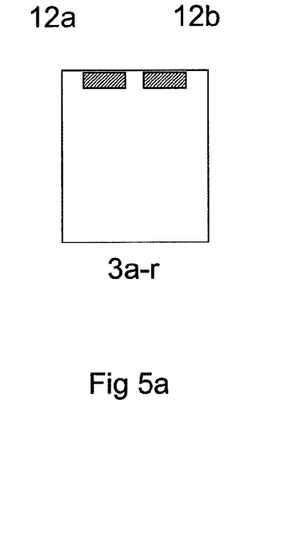
FIGS. 5a, 5b, and 5c show in schematic diagrams of a wireless configuration device arranged with hardware and software for communicating with an industrial monitoring or control system according to another embodiment of the invention.
Figures 5B, 5C:
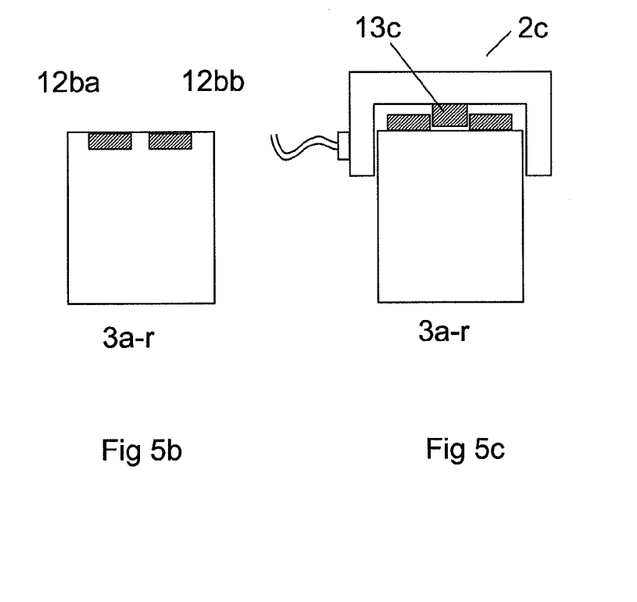

In the schematic diagram FIG. 5a-c the connector 2 is arranged as a cap which fits over and encloses a part of the sensor including the wireless receiver/transmitter devices 12a, 12b. The wireless transmitters 12a, 12b, 13a, 13b may be photoelectric emitters, receptors embodied for example as light emitting diodes (LEDs) of the known type. For configuration of any node or sensor or a new sensor/field device 3' (FIG. 1) a serial communication stream may be emitted by one or more wireless transmitters 13a, 13b in the connector device 2 and received by the wireless receiver/transmitters 12a, 12b arranged on the field device 3' or sensor. The wireless transmitters may be embodied in a preferred embodiment as PSDs Position Sensitive Device, which are a type of optical sensor or photosensor. Such photosensors allow a configuration device to communicate with the field device without the need for a physical connection to the field device. This is an important advantage and under some conditions, in particular in areas with a risk for explosion. No physical connection is required between the configuration device and the field device allowing device-to-device communication in hazardous environments. This is also advantageous in that it is possible to use this communication via a connector such as connector 2 to wake-up a sleeping device in order to interact with it at any time. This could be for the purpose of configuring a new field device or other node, for interrogating a sleeping device, for updating software or data, or any other interaction.

In the schematic diagram of FIG. 4 (and FIG. 5, below) the connector 2 is shown arranged as a cap which fits over and physically encloses a part of the sensor that includes the wireless receiver/transmitter devices 12a, 12b. The connector device 2 places one or more wireless receiver/transmitter devices in close proximity to, or even touching, one or more wireless receiver/transmitter devices arranged on the sensor. The physical shape of the connector device is not limited to the shape shown and may alternatively be arranged as another shape of connector, for example a connector that fits inside a part of the sensor, a connector being partly enclosed by a part of the sensor, and so on.

Figure 3:
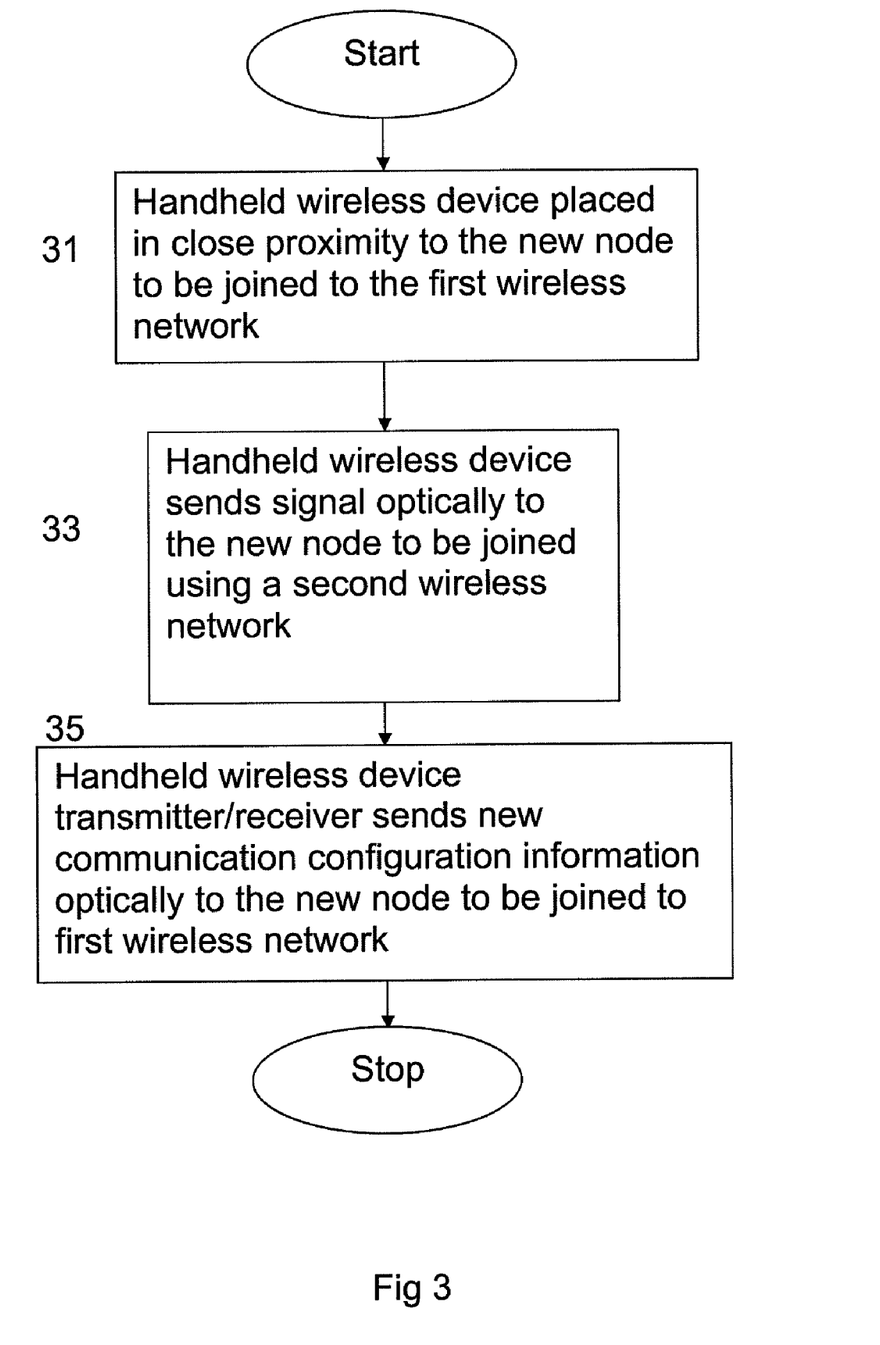
FIG. 3 is a flowchart showing use an embodiment of a method of the invention for using the wireless configuration device for communicating with a field device in an industrial monitoring or control system.

The flowchart of FIG. 3 shows steps of a method for using the wireless configuration device or handheld wireless device for communicating with a field device in an industrial monitoring or control system 31. Handheld wireless device placed in close proximity to the new node to be joined to the first wireless network,
33. Handheld wireless device sends signal optically to the new node to be joined using a second wireless network,
35. Handheld wireless device transmitter/receiver sends new communication configuration information optically to the new node to be joined to first wireless network.

In another embodiment the wireless receiver/transmitter devices may be of a magnetic type or an inductive type. FIG. 5 shows the invention wherein a type of wireless receiver/transmitter devices is described other than optical or photo-optical. FIG. 5a shows a sensor such as 3' or 3a-e (see FIG. 1) arranged with wireless receiver/transmitter devices 12a, 12b. FIG. 5b shows a sensor arranged with wireless receiver/transmitter devices 12ba, 12bb which are embodied as a coil comprising one or more turns of inductive material. Induction coils (not shown) in the connector 2 (not shown) are arranged to induce a current in the induction coils 12ba, 12bb when the connector device is placed on the sensor and the wireless inductive devices are in close proximity to each other. FIG. 5c shows an arrangement in which an inductive device 6 is arranged in a connector device 2c. When placed on the sensor the inductive coil 6 or other device in the cap is placed, in the example shown, inserted between two inductive devices 2ca and 2cb arranged on the sensor. An electric current is induced in one set of inductive devices (eg 12a, 12b) by a modulated electric field or current in the other set (eg 13a, 13b) of inductive devices such that signals are transferred wirelessly across an interface between the connector and the sensor or field. This embodiment may be carried out using Radio Frequency Identification technology (RFID) to communicate wirelessly between a connector device such as the cap connector 2 and the node.

Methods of the invention may be supervised, controlled or carried out by one or more computer programs. One or more microprocessors (or processors or computers) comprise a central processing unit CPU connected to or comprised in one or more of the above described camera control system and/or DCS, which processors or computers perform the steps of the methods according to one or more aspects of the invention.

The computer program comprises computer program code elements or software code portions that make the computer or processor perform the methods using equations, algorithms, data, stored values, calculations, synchronisations and the like for the methods previously described, and for example in relation to the flowcharts of FIGS. 2-3. A part of the program may be stored in a processor as above, but also in a ROM, RAM, PROM, EPROM or EEPROM chip or similar memory means. Some of the programs in part or in whole may also be stored locally (or centrally) on, or in, a memory storage device of a control system or network control node. The program may also in part be supplied or updated from a data network, including a public network such as the Internet.

It should be noted that while the above describes exemplifying embodiments of the invention, there are several variations and modifications which may be made to the disclosed solution without departing from the scope of the present invention as defined in the appended claims.

We claim:

1. A method for joining a wireless node of a field device to a first wireless network connected to an industrial monitoring or control system using a wireless configuration device, said wireless node being preconfigured for operation with a second wireless network, the method comprising:
    sending with said second wireless network from said wireless configuration device to at least one new wireless node communication configuration information necessary for the new wireless node of a field device to join said first wireless network, wherein the communication configuration information comprises security and network information;
    receiving with the at least one new wireless node the communication configuration information;
    setting the at least one new wireless node according to the communication configuration information;
    the at least one new wireless node transmitting over the first wireless network announcement information or listening for an announcement from the first wireless network; and
    the first wireless network configuring the at least one new wireless node as a node in the first wireless network.
2. The method according to claim 1, further comprising:
    sending the communication configuration information from said wireless configuration device to the new wireless node of a field device, using said second wireless network and utilizing the same wireless hardware used for communicating with said first wireless network.
3. The method according to claim 1, wherein the wireless technology of said first wireless network is arranged compatible with an industrial standard for wireless communication.
4. The method according to claim 1, wherein the wireless technology of said first wireless network is arranged compatible with a WirelessHART standard.

5. The method according to claim 1, further comprising:
sending the communication configuration information for the new wireless node of a field device to join said first wireless network which communication configuration comprises information to identify the said first wireless network.

6. The method according to claim 1, wherein the security key or security code is for the new wireless node to be accepted in said first wireless network.

7. The method according to claim 1, further comprising:
sending to the new wireless node communication configuration information necessary for joining said first network comprising an identity of the new wireless node of a field device in said first wireless network.

8. The method according to claim 1, further comprising:
sending to the new wireless node communication configuration information necessary for joining said first network comprising an identity of the new said wireless node in said industrial monitoring or control system.

9. The method according to claim 1, further comprising:
sending from the new wireless node to said wireless configuration device communication configuration information that comprises a unique hardware identity of the new wireless node.

10. The method according to claim 1, further comprising:
sending from said wireless configuration device to said first wireless network communication configuration information about the new wireless node comprising any from the group of: device role name, device tag name, system key or code, security code.

11. The method according to claim 1, further comprising:
sending to the new wireless node an operational configuration for the new wireless node to operate with in said industrial monitoring or control system.

12. The method according to claim 1, further comprising:
sending, from said wireless configuration device to the new wireless node of a field device using an optical transmitter and/or receiver, the communication configuration information necessary for the new wireless node to join said first wireless network.

13. The method according to claim 1, further comprising:
sending, from said wireless configuration device to the new wireless node of a field device using an optical transmitter and/or receiver, information to form said second wireless network between said wireless configuration device and the new wireless node and after said second wireless network is established, sending to the new wireless node the new communication configuration information necessary for the new wireless node to join said first wireless network.

14. The method according to claim 1, further comprising:
configuring a node of a field device by manually resetting the node of the field device to said second wireless network and subsequently sending, from said wireless configuration device to the reset node, communication configuration information necessary for the reset node to use in order to join said first wireless network.

15. The method according to claim 1, further comprising:
the wireless configuration device communicating with said industrial monitoring or control system with the hardware and software the wireless configuration device is arranged with.

16. The method according to claim 1, wherein said wireless configuration device is comprises hardware and/or software such that the device is arranged connectable to said first wireless network, or said second wireless network, or both.

17. The method according to claim 1, further comprising:
communicating utilizing said wireless configuration device with said first wireless network.

18. The method according to claim 17, further comprising:
communicating utilizing said wireless configuration device with said first wireless network utilizing a wireless radio device compatible with any from the group of WLAN, WirelessHART, ZigBee, Bluetooth, WISA.

19. The method according to claim 1, further comprising:
operating said first wireless network as a radio network using an Industrial Scientific and Medical band.

20. The method according to claim 1, further comprising:
accessing said field device using said second wireless network and carrying out a test procedure on the field device while said field device is connected to said second wireless network.

21. The method according to claim 1, further comprising:
monitoring or collecting data from the field device while the field device is also connected for wireless communication to said first wireless network.

22. A computer program product, comprising:
a non-transitory computer readable medium; and
computer program instructions recorded on the computer readable medium and executable by a processor for carrying out a method for communicating with a field device connected to a first wireless network, said method comprising
sending with said second wireless network from said wireless configuration device to at least one new wireless node communication configuration information necessary for the new wireless node of a field device to join said first wireless network, wherein the communication configuration information comprises security and network information;
receiving with the at least one new wireless node the communication configuration information;
setting the at least one new wireless node according to the communication configuration information;
the at least one new wireless node transmitting over the first wireless network announcement information or listening for an announcement from the first wireless network; and
the first wireless network configuring the at least one new wireless node as a node in the first wireless network.

23. An industrial monitoring or control system, comprising:
at least one field device comprising a wireless node, said wireless node being preconfigured for operation with a second wireless network;
a first wireless network;
a wireless configuration device for communicating with said wireless node of said at least one field device, said wireless configuration device comprising hardware and software for sending utilizing said second wireless network from said wireless configuration device to at least one new wireless node of a field device communication configuration information necessary for the new wireless node of a field device to join said first wireless network, wherein the communication configuration information comprises security and network information,
wherein the at least one new wireless node is configured to receive the communication configuration information, the at least one new wireless node is configured to be set according to the communication configuration information, the at least one new wireless node is configured to transmit over the first wireless network announcement information or to listen for an announcement from the first wireless network, and the first wireless network is configured to configure the at least one new wireless node as a node in the first wireless network.

24. The system according to claim 23, wherein said wireless configuration device comprises hardware and software for communicating with said industrial monitoring or control system.

25. The system according to claim 23, wherein said wireless configuration device is arranged for communicating with said industrial monitoring or control system in way compatible with any from the group of WLAN, WirelessHART, ZigBee, Bluetooth, WISA.

26. The system according to claim 23, wherein said wireless configuration device comprises hardware and/or software such that the device is connectable to said first wireless network or said second wireless network, or both.

27. The system according to claim 23, wherein said wireless configuration device is arranged with hardware and/or software and connectable to the said first wireless network according to a configuration with which the device is connected as if the device were a field device.

28. The system according to claim 23, wherein said wireless configuration device comprises hardware and software for carrying out one or more functions of a master node in said first or second wireless network when communicating with a node of a field device.

29. The system according to claim 23, wherein said wireless configuration device comprises hardware and software for carrying out one or more functions of a network device in said first wireless network when communicating with a node of a field device.

30. The system according to claim 23, wherein said wireless configuration device comprises hardware and software for monitoring an exchange of information between a node of a field device being joined and said first wireless network.

31. The system according to claim 23, wherein said first wireless network uses radio transmitter/receivers operating compatible with any from the group of WLAN, WirelessHART, ZigBee, Bluetooth, WISA.

32. The system according to claim 23, wherein said first wireless network is one of a plurality of wireless networks within range of one or more field devices and connected to said industrial monitoring or control system.

33. The system according to claim 23, further comprising:
a wireless radio transmitter/receiver network forming said first wireless network; and
one or more optical transmitter/receivers arranged to operate in a second network.

34. The system according to claim 23, wherein the wireless configuration device comprises a handheld configuration device.

35. The system according to claim 23, wherein the wireless configuration device comprises a portable computer.

36. The system according to claim 23, wherein the wireless configuration device is arranged connected to said monitoring or control system and to transmit and/or receive utilizing a node of a field device or network device of said first wireless network and also arranged operable to communicate using the second network.

* * * * *